July 9, 1957    J. M. MASKULKA ET AL    2,798,520
DRILL GUIDE
Filed March 2, 1955

INVENTORS
JOSEPH M. MASKULKA &
JOHN E. PARENT
BY
W. B. Hauptman
ATTORNEY

United States Patent Office 2,798,520
Patented July 9, 1957

2,798,520

DRILL GUIDE

Joseph M. Maskulka and John E. Parent,
Youngstown, Ohio

Application March 2, 1955, Serial No. 491,634

2 Claims. (Cl. 145—129)

This invention relates to a drill guide and more particularly to a simple and inexpensive drill guide for use with woodworking equipment.

The principal object of the invention is the provision of a simple and inexpensive drill guide for drilling uniformly spaced and positioned openings in wooden objects.

A further object of the invention is the provision of a drill guide which may be applied to any portion of an article to be drilled and held thereon temporarily while serving to guide a drill bit.

A still further object of the invention is the provision of a drill guide which is particularly useful in the drilling of uniformly aligned and positioned openings in the diagonal end sections of material to receive dowel pins and replace the customary morticing of the pieces to be joined.

A still further object of the invention is the provision of a drill guide incorporating an alignment opening enabling the drill guide to be centered on a predetermined center line of an article to be drilled.

The drill guide disclosed herein comprises a simple and inexpensive device primarily intended for use by the home owner or handy man in woodworking operations such as in the building of cabinets, frames, glazed and screen sash, etc.

It has heretofore been difficult to drill openings in pieces of wood that are to be joined together either at an angle to one another or otherwise, and to form the openings so that they will receive dowel pins in substantial alignment and uniformity of spacing with respect to the surfaces of the wooden pieces drilled.

The present drill guide may be simply positioned over the end, side or other surface of a piece of wood to be drilled and held in that position by the workman or by a vise grip wrench or C-clamp or the like and a drill bit positioned through the drill guide to perfectly and uniformly form an opening in a desired location and on the desired alignment.

An alignment opening is provided in the drill guide on the center lines thereof enabling the same to be aligned with a center line on the article being drilled in a most convenient manner.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
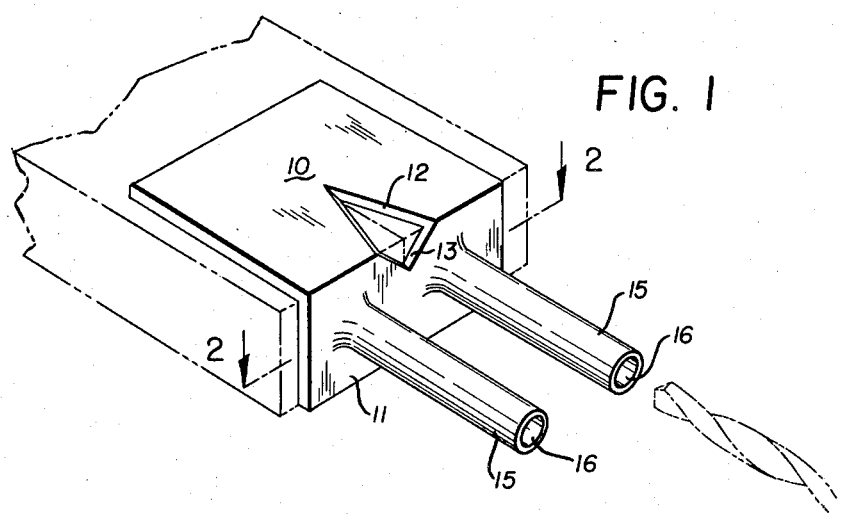
Figure 1 is a perspective view of the drill guide, broken lines showing a piece of material to be drilled and a drill bit.
Figure 2:
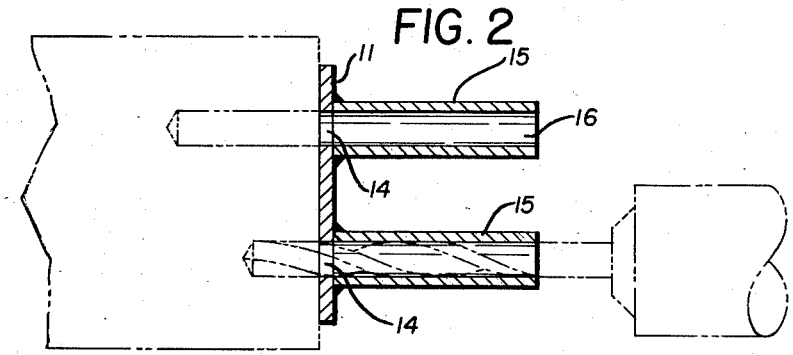
Figure 2 is a horizontal section taken on line 2—2 of Figure 1 with broken lines showing the section of material to be drilled, a drill formed therein and a drill bit positioned through the drill guide and into the material.

By referring to the drawings and Figures 1 and 2 in particular, it will be seen that the drill guide comprises a flat rectangular body member 10 having a downturned right angled flange 11 on one edge thereof with an angularly formed alignment opening 12 extending in inverted V-shape from the edge of the body member 10 on which the flange 11 is formed to a point inwardly from said edge and the flange 11 having a V-shaped opening 13 formed vertically therein from the edge thereof by which it is joined to the rectangular body member 10.

The apex of each of the openings 12 and 13 form a center line alignment guide with respect to the drill guide and a center line on a section of material to be drilled.

The flange 11 of the drill guide is provided with a pair of uniformly spaced openings 14—14. A pair of uniformly spaced tubular members 15—15 are secured to the outer surface of the flange 11 in registry with the openings 14—14 and extend outwardly therefrom a distance substantially equal to the width of the rectangular body member 10 of the drill guide.

The tubular members 15—15 have relatively thin walls and define cylindrical passageways 16—16 capable of receiving drill bits of slightly smaller diameter and guiding the same into the material on which the drill guide is positioned.

In Figure 1 of the drawings the drill guide is shown in position on an end section of a portion of material to be drilled having a center line inscribed thereon and aligned with the apex of each of the V-shaped openings 12 and 13 heretofore described. A drill bit is shown in longitudinal alignment with one of the cylindrical passageways 16.

In Figure 2 of the drawings the drill guide is shown in cross section and the section of material is shown with one opening completed therein and a second opening being formed by a drill bit passed through one of the tubular members 15.

Figure 3:
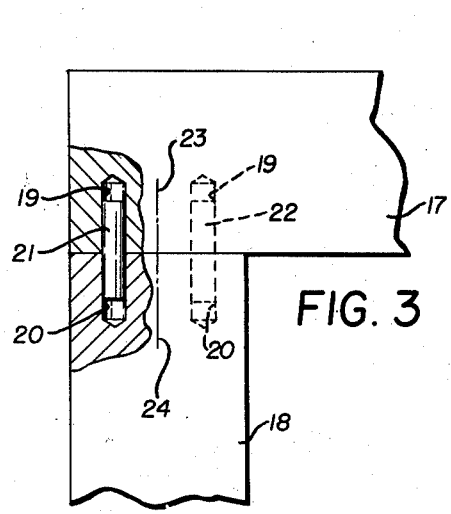
Figure 3 is a plan view with parts broken away and parts in cross section illustrating the end to side joining of two pieces of material with dowel pins positioned in openings drilled with the drill guide of Figures 1 and 2.
Figure 4:
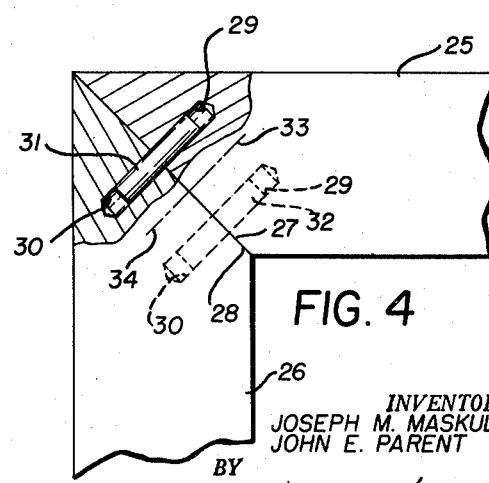
Figure 4 is a plan view with parts broken away and parts in cross section showing two pieces of material with diagonally formed end portions in abutting relation and secured to one another with dowel pins positioned in openings drilled in the pieces of material with the drill guide.

It will be observed that a relatively long length of the tubular members 15 positively guides the drill bit used and causes perfect alignment between the openings formed whether the same are in the end of a section of material, as shown in Figures 1 and 2 of the drawings, or in the end and side, as shown in Figure 3 of the drawings, or diagonal end portions of material, as shown in Figure 4 of the drawings.

In Figure 3 of the drawings, two sections of material 17 and 18 are disclosed, each of which has a pair of oppositely disposed openings 19 and 20, respectively, formed therein. The openings 19 and 20 have dowel pins 21 and 22 positioned therein, thus joining the sections of material 17 and 18 uniformly to one another. Such uniform joining is easily obtained through the use of the drill guide illustrated in Figures 1 and 2 of the drawings as the same automatically positions the drill bit when the openings are formed so that they will subsequently be found to be in perfect alignment, center lines 23 and 24 having been initially provided on the sections of material 17 and 18 by means of which the drill guide was desirably positioned for the drilling operation.

In Figure 4 of the drawings two pieces of material 25 and 26 are illustrated with diagonally shaped end portions 27 and 28, respectively, and transversely extending oppositely disposed drilled openings 29 and 30, respectively, being formed therein.

Dowel pins 31 and 32 are positioned in alignment in the oppositely disposed openings 29 and 30 and will be found to position the diagonal end portions 27 and 28 of the sections of material 25 and 26 in perfect alignment and on a common horizontal or vertical plane, as the case may be, center lines 33 and 34 previously located adjacent the ends 27 and 28 having provided for the uniform positioning of the drill guide and the subsequent uniform formations for the openings 29 and 30.

It will occur to those skilled in the art that the drill guide disclosed herein may be used on individual pieces of material such as sections of door casing, sash framing and the like and that it may be equally easily used for drilling spaced aligned openings in a finished door, wall or other object as its simple, lightweight, relatively small form enables it to be positioned in many and various places and successfully used as a drill bit guide.

It will thus be seen that the drill guide disclosed herein meets the several objects of the invention.

Having thus described our invention, what we claim is:

1. A drill guide comprising a rectangular body member having a flange formed on one edge at right angles thereto, said flange having a pair of openings therein, a pair of tubular members secured to said flange in registry with said openings and extending outwardly therefrom, said rectangular body member and flange having oppositely disposed converging alignment openings formed therein inwardly thereof with respect to their abutting edges.

2. A drill guide comprising a section of flat material having a flange along one edge thereof, a section of said material and said flange cut away to form opposed V-shaped edges defining an alignment opening, a pair of tubular members secured to said flange and extending outwardly therefrom with respect to said section of flat material and spaced with respect to an extension of the plane thereof, openings in said flange in registry with said tubular members and defining passageways through which a drill may be positioned.

References Cited in the file of this patent

UNITED STATES PATENTS

| | | |
|---|---|---|
| 1,736,709 | Flagg | Nov. 19, 1929 |
| 2,466,023 | Griffin | Apr. 5, 1949 |
| 2,597,152 | Kornmayer | May 20, 1952 |